Sept. 4, 1945.  G. H. GILL  2,384,248
OIL COOLING DEVICE
Filed Sept. 5, 1942  2 Sheets-Sheet 2
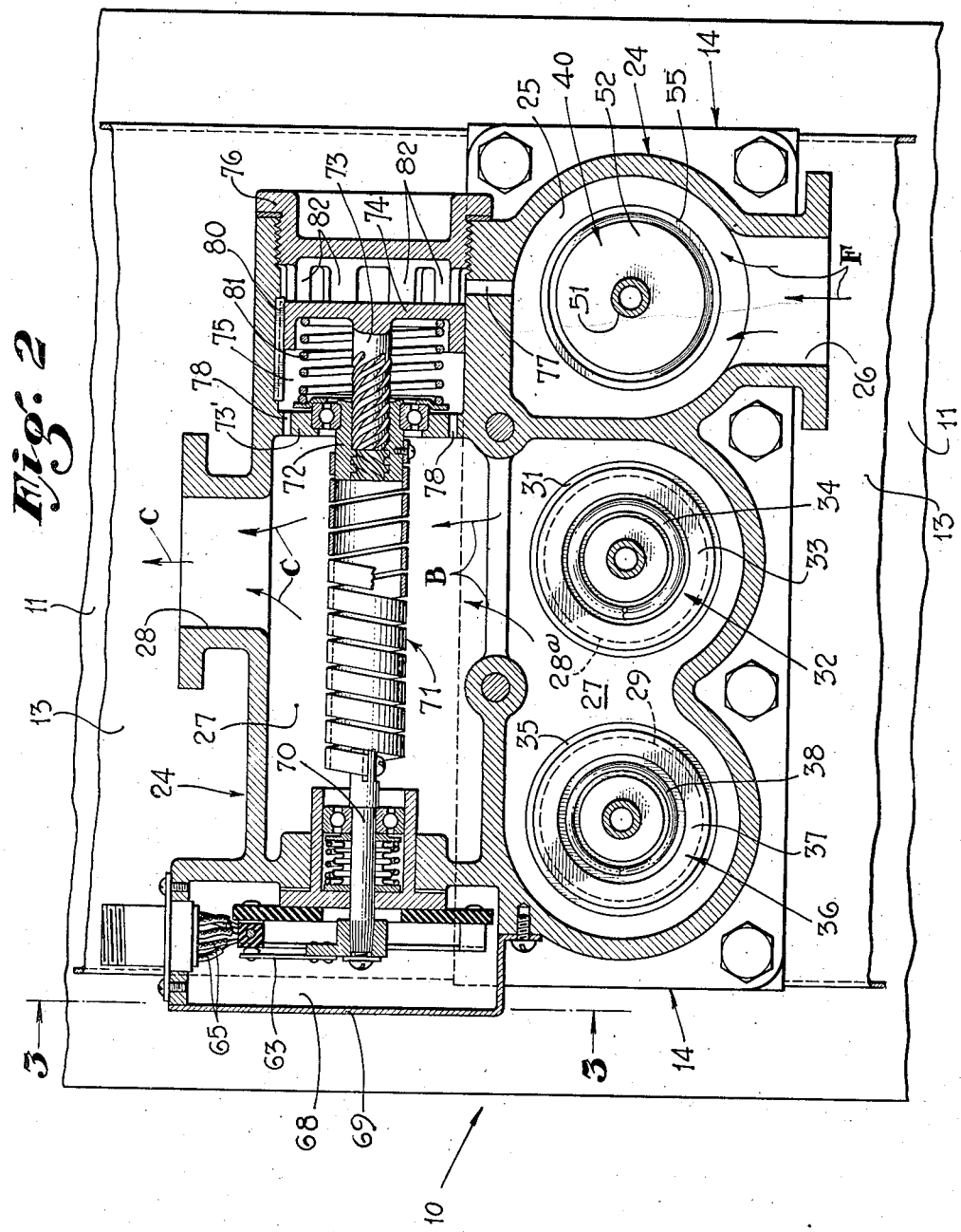
Fig. 2
Inventor:
GEORGE HERBERT GILL,
By
Attorney.

Patented Sept. 4, 1945

2,384,248

UNITED STATES PATENT OFFICE 2,384,248

OIL COOLING DEVICE

George Herbert Gill, Los Angeles, Calif., assignor to The Garrett Corporation, Airesearch Manufacturing Company division, Inglewood, Calif., a corporation of California Application September 5, 1942, Serial No. 457,461

8 Claims. (Cl. 257—2)

This invention relates in general to oil cooling systems for internal combustion engines. The invention has one application in the field of oil coolers for aircraft engines.

Oil coolers of the type now generally employed for aircraft installation comprise a cellular type of heat exchanger having inlet and outlet openings which are respectively connected in series with the oil circulating system, a means for regulating the cooling action of the heat exchanger, and some form of control for the regulating means which acts to provide a flow of oil from the cooler to the aircraft engine within a temperature and viscosity range satisfactory for efficient operation and lubrication of the engine.

This invention relates in particular to the control for the regulating means of the heat exchanger.

The heat exchanger is an oil container, often in the shape of a cylindrical drum, through which oil passes from an oil inlet to an oil outlet in heat exchange relation with metal tubes within the drum, through which atmospheric air is passed by the action of the aircraft propeller, supercharger, or compressor means, or in consequence of the motion of the aircraft through the atmosphere.

The heat exchanger may include a supplementary oil container in the form of an oil jacket or muff surrounding a core or cooler proper in which the air tubes are mounted, or in the form of a separate compartment, within the cooling chamber, or both, through which oil as it comes from the engine may be passed to warm the cooling element.

To maintain constant the temperature of the oil leaving the cooler, the rate of transfer of heat units from the oil to the refrigerant air must be regulated to compensate for changing conditions of the oil and air streams. This regulation is accomplished in one type of cooler by varying the rate of flow of air through the core by use of movable shutters, flaps, or other air stream controlling means which may be adjusted in position with respect to the direction of the flow of air for varying the flow rate of air through the core tubes in combination with an actuating means for giving the shutters the movement of adjustment.

According to one type of oil temperature control, the means for regulating the position of the air stream shutters is controlled by a thermostat responsive to the temperature of the oil leaving the cooler, the shutters being opened or closed in correspondence with oil temperatures above or below the temperature desired for best engine operation.

The problem of oil temperature control is complicated by the fact that under certain conditions congealing or waxing of the oil within the core on the external surfaces of the air tubes or other heat exchange walls takes place due to an abnormally rapid transfer of heat from the oil to the air or to an unduly prolonged period of transfer of heat from oil to air at a moderately rapid rate. This condition usually arises from an excessively rapid drop in the temperature of the atmospheric air or a rapid increase of air flow to which the thermostatic control cannot as rapidly respond. The formation of layers of waxed oil on the air tubes restricts the flow of oil through the core chamber, and may increase the pressure at the oil inlet of the cooler so as to build up a back pressure against the oil circulating pump and cause diversion of a portion of the hot oil through the bypass passage. Also, since the layers of waxed oil being of low heat conductivity, act as heat insulators between the liquid oil and the air, the oil flowing through the cooler in a restricted path at high speed leaves the cooler at an unduly high temperature. This hot oil is a disadvantage in the operation of the engine, and by causing the thermostat to hold the shutters open, prevents the decrease in the cooling action of the cooler which is necessary to melt the congealed oil. Excessive pressure may also develop in the cooler core in the absence of waxing of oil on the air tubes if the core is filled with cold viscous oil when a cold engine is started, or for other reasons.

It is an object of the invention to provide a cooling system in which the regulation of the cooling medium, for example, air, is under control of the temperature of the oil which has been cooled, modified by pressure changes which occur in the cooler, whereby an increase in pressure in the cooler due to cooling or a tendency of the oil to congeal will result in a corresponding decrease in the effectiveness of the cooling medium to offset this tendency for the oil to congeal.

One object of the invention is the provision of a cooling system of the character described having a thermostatic control of the heat exchanger regulating means, in which the fluid pressure drop between the cooler inlet and cooler outlet is utilized under control of a thermostat to operate in either direction a reversible fluid pressure motor to open or close the shutters or other air flow regulating means in a simple, effective, and reliable manner.

It is an object of the invention to provide a fluid cooling system with combined temperature and pressure control of the kind above described in which the temperature and pressure controls are combined in a novel and effective manner, affording structural simplicity and reliability in performance.

It is an object of the invention to provide a fluid cooling system having a combined temperature and pressure control in which a thermostat for effecting the temperature control is bodily movable by fluid pressure operative device responsive to the pressure drop in the cooler in a manner to modulate the control action of the thermostat on the shutter operating means.

It is another object of the invention to provide a fluid cooling system having a combined temperature and pressure control in which the temperature control is modulated by a fluid pressure operated means responsive to pressure drop in the cooler.

It is a further object of the invention to provide a device of the character described in which a thermostat is bodily movable by reason of its connection to a movable wall, the two active faces of which are exposed to fluid pressure communicated to the movable wall from two relatively spaced stations along the flow path of the fluid stream.

It is still another object of the invention to provide a fluid cooling system having a combined temperature and pressure control in which a thermostat for effecting the temperature control is in the form of a spiral and is bodily rotatable by a fluid pressure device responsive to the pressure drop in the cooler and particularly by a hydraulic motor suitably connected to the inlet and outlet passages of the cooler.

It is also an object of the invention to provide a fluid cooling system having a combined temperature and pressure control in which a spirally formed thermostat for accomplishing the temperature control is bodily operated by a hydraulic motor connected to the inlet and outlet passages of the cooler by means of an overrunning screw and nut connection between a non-rotatable piston of the hydraulic motor and the dead end of the thermostat.

It is another object of the invention to provide a fluid cooling system having a combined temperature and pressure control of the kind above described in which a normally closed valved by-pass passage is provided for the relief of the cooler chamber from excessive pressures in the inlet piping, in which the cooler chamber is protected from excessive back pressures in the outlet piping and in which the thermostat for accomplishing temperature control under the modulating influence of the pressure drop between the inlet and outlet passages is disposed downstream from the bypass passage and from the devices for protecting the cooler chamber from back pressures in the outlet piping.

Further objects and advantages of the invention will be brought out in the following part of the specification.

Referring to the drawings, which are for illustrative purposes only,

Fig. 2 is a horizontal sectional view taken as indicated by lines 2—2 of Fig. 1.

Fig. 3 is a sectional view taken as indicated by the lines 3—3 of Fig. 2.

Fig. 4 is a schematic view indicating the air shutters and the control mechanism therefor.

Figure 1:
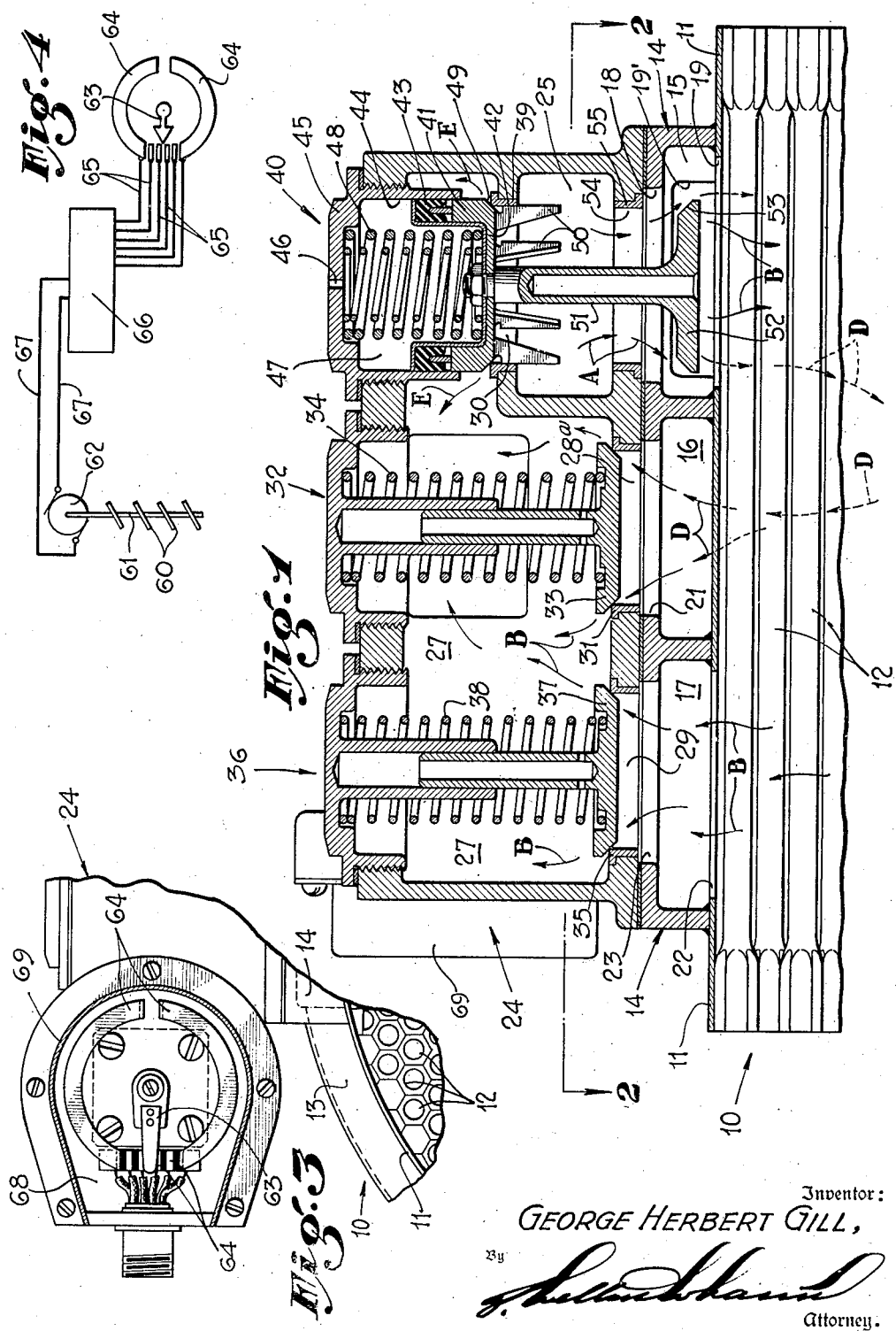
Fig. 1 is a vertical sectional view showing a control fitting and adjacent portions of a cooler embodying the invention.

A heat exchanger 10 comprises a core consisting of a drum 11 and air tubes 12 mounted therein and a muff, the chamber of which encircles the core and is provided between a muff drum 13 and the core drum 11.

The muff drum 13 is cut away at the top for a short arcuate distance and a fitting 14 is secured to the core drum 11 and to the ends of the muff drum 13. The fitting 14 is formed with an inlet chamber 15, a muff outlet chamber 16, and a core outlet chamber 17. The inlet chamber 15 has an inlet opening 18 and its lower open side registers with an inlet opening 19 in the drum 11. The inlet chamber 15 is also formed with an opening 19' communicating with one end of the muff chamber.

The muff outlet chamber 16 which communicates with the outlet end of the muff through an opening (not shown) is formed with an outlet opening 21 in the upper wall of the fitting 14. The core outlet chamber 17 has its lower open side in registry with a core outlet opening 22 in the drum 11 and is formed with an outlet opening 23.

A control fitting 24 is secured to the fitting 14. It is formed with an inlet chamber 25 which receives oil from the hot oil delivery piping of the engine through a port opening 26. It is also formed with an outlet chamber 27 from which oil is withdrawn into the cooled oil return piping to the engine through an outlet port 28.

The outlet chamber 27 has a core inlet opening 29 registering with the opening 23 of the core outlet chamber 17 of the fitting 14 and has an opening 28a registering with the muff outlet opening 21 of the chamber 16 of the fitting 14. The walls of the fitting 24 are also formed with an opening 30 between the inlet chamber 25 and outlet chamber 27. The openings 28a, 29, and 30 are fitted with valve seats 31, 35, and 39 respectively.

A poppet valve structure 32 having a valve closure 33 engaging the valve seat 31 and a spring 34 under pressure conditions attendant upon the normal operation of the cooling system prevents flow of oil through the opening 28a from the muff outlet to the outlet chamber 27 and also protects the muff chamber from back pressures of excessive value in the cooled oil return piping. The spring 34 is gauged to permit lifting of the valve closure 33 when pressure in the muff outlet chamber 16 and pressure in the inlet chamber 15 which serves both the core chamber and the muff chamber becomes sufficiently high to endanger the walls of other structural elements of the core and muff.

A similar poppet valve structure 36 has a valve closure 37 which engages the valve seat 35. The spring 38 of this valve structure 36 is gauged to hold the valve closure 37 open in response to light pressures within the core chamber such as are attendant upon its normal operation, but will cause a seating of the valve closure 37 in response to even a light back pressure in the outlet chamber 27 arising from a back pressure surge in the return piping to the engine.

Oil received from the engine into the chamber 25 may pass from that chamber into the inlet chamber 15 or the outlet chamber 27 as determined by the operation of a valve structure 40. A cup shaped piston 41 has a piston head 42 exposed on its lower face to the pressure of oil in the chamber 25 and has a cylindrical piston wall 43 extending upwardly from the piston head 42 and having cooperative sliding engagement with the inner face of a cylinder 44 mounted by means of a threaded plug 45 integrally formed with the cylinder in the upper wall of the fitting 24. The plug 45 has a port 46 which subjects the space or chamber 47 within the cylinder to the atmospheric pressure exterior to the fitting 24. Since, then, the upper face of the piston head 42 is subjected to atmospheric pressure, any super atmospheric excess in fluid pressure within the chamber 25 will be effective to move upward the piston 41. This movement is opposed by a spring 48 seated between the plug 45 and piston head 42. As shown in the drawings, this spring takes the form of a double coiled spring seated under compression in the chamber 47.

The piston 41 is formed with a valve face 49 which cooperates with the valve seat 39 to control flow of oil from the inlet chamber 25 to the outlet chamber 27 through the annular opening formed between the lower end of the cylinder 44 and the valve seat 39. Guide tongues 50 depending from the piston head 42 slidably engage the bore of the valve seat 39 to keep the piston axially aligned with the valve seat.

A valve stem 51 is secured at its upper end to the piston head 42 and extends downwardly through the valve chamber 25 and mounts on its lower end a valve closure 52 having a valve face 53 disposed to cooperate with the valve seat 55 and so spaced from the valve face 49 that, when the latter is in seated position, valve face 53 is displaced downwardly from its valve seat 55 allowing oil to flow from the inlet chamber 25 through the port 54 into the inlet chamber 15. When, on the other hand, the valve face 53 is seated against the valve seat 55, the valve face 49 is displaced above its valve seat 39, allowing oil to flow from the inlet chamber 25 into the outlet chamber 27.

Under normal pressure conditions within the inlet chamber 25 the spring 48 holds the valve 49 in closed position and the valve 52 in open position, allowing oil from the engine to flow through the inlet chamber 25 into the heat exchanger inlet chamber 15 from which it may pass either through the core chamber or the muff chamber, as will be later explained. When, however, pressure in the inlet chamber 25 rises to an excessive value, the piston 41 is moved upwardly, lessening the flow of fluid by valve 52 and opening the valve 49, permitting a portion of the oil stream in the inlet chamber 25 to flow directly into the outlet chamber 27 and thence to the return piping to the engine, protecting the heat exchanger chambers from such excessive pressure in the inlet chamber 25. When the inlet pressure reaches a prescribed value, the valve 52 will close against its seat and the valve 49 will be elevated to its completely open position. The valve structure may move with a quick snap action from its lowermost to its uppermost position in response to a suddenly occurring pressure surge. These excessive pressures are usually caused by a rapid rise in pressure in the inlet piping generated by the scavenging pump at the engine, but the development of an excessive pressure may be facilitated when the muff and core chambers of the heat exchanger are filled with cold oil when the engine is started or by excessive congelation of oil within the core chamber. Under any condition which may cause upward movement of the valve stem 51, both elements of the heat exchanger are bypassed until pressure in the chamber 25 recedes to a normal value.

Upward movement of the valve structure 40 is initiated by the difference between the pressure in the chamber 25 on the area of the valve seat opening 39 and the force exerted by the spring 48. On the other hand, after the valve structure 40 has reached its extreme upper position and the valve face 53 has engaged the valve seat 55, the valve structure 40 is held in its uppermost position against the action of the spring 48, not only by the heat exchanger back pressure on the under face of the valve 52, but also by the pressure in the chambers 25 and 27 exerted over an area which is the difference in the area of the valve seat opening 39 and the cross-sectional area of the cylindrical chamber 47. This follows because the total pressure acting on the valve 52 within the valve seat opening 55 is balanced by the total pressure acting on that part of the valve face 49 within the valve seat opening 39, these openings having the same diameter. The above defined areal difference is the area of the horizontal projection of the annulus of the valve face 49 outside of the valve seat 39. The pressure on this annular area acts as a safety factor to hold valve 52 in closed position and prevent a chattering movement thereof until the pressure in the chamber 25 has dropped below the danger point and the pressure in the chamber 15 is a substantial degree less than that in the chamber 25. This performance characteristic of the valve structure 40 gives additional protection to the two chambers of the heat exchanger.

Flow of oil from the inlet piping, leading from the engine, to the return piping to the engine may follow any one of three paths through the fitting 24 and heat exchanger 11 as determined by the positions of the several valve devices 40, 32, and 36.

Under normal conditions oil enters through the inlet port 26 into the inlet chamber 25 as indicated by arrows F in Fig. 2. Thence it passes into the heat exchanger inlet chamber 15 as indicated by arrows A in Fig. 1, from which chamber it passes through the core chamber as indicated by arrows B, and after passing through the core chamber in contact with the air tubes 12, passes through the core outlet chamber 17 into the outlet chamber 27 as indicated also by arrows B. From the outlet chamber 27 it leaves the fitting through the port 28 passing into the return piping to the engine as indicated by the arrows C.

If a heavy back pressure develops in the core chamber, the valve 33 is lifted, permitting oil to pass from the inlet chamber 25 into the heat exchanger inlet chamber 15, as indicated by arrows A, and thence, as indicated by arrows D, through the muff chamber to the muff outlet chamber 16, opening 28a, and the outlet chamber 27, from which it passes into the return piping leading to the engine as indicated by arrows C in Fig. 2.

If the pressure in the chamber 25 rises to an excessive value the valve structure 40 is lifted and oil passes from the inlet chamber 25 through the port opening 30 directly into the outlet chamber 27, as indicated by arrows E, from which it enters the return piping to the engine, as indicated by arrows C.

High pressure in the outlet chamber 27 generated, for example, by some conditions in the return piping to the engine causes an immediate seating of the check valve structures 36 and 32, and moves the valve structure 40, if already partly open, to its uppermost position, closing the outlet ends of the port chamber and muff respectively, as well as the common inlet end of these chambers at the port opening 54. If at the moment of a high pressure surge in the return piping, the valve face 53 is in seated position and remains seated, it protects both the muff and core from the surge pressure at their inlet ends.

The means for regulating the refrigerant may take any of the forms known to the art. The invention teaches how the regulating means, whether it is directly connected to the control thermostat or is operated by a motor under control of the thermostat, may be caused to act not only in response to changes in the temperature in the oil, but in accordance with temperature changes modified by pressure conditions in the cooler. The movable contact arm 63, shown in Figs. 2 and 3, is broadly presented as a control part operated in accordance with temperature changes modified by pressure conditions in the cooler. By way of example, it is shown as a contactor forming a part of an electrical shutter operating means, more schematically presented in Fig. 4, of the type disclosed in the copending application of Andrew L. Hannon, Serial No. 430,949, filed February 14, 1942, for Control device for oil coolers, which has issued as United States Patent No. 2,314,937.

The passage of air through the tubes 12 is controlled by the shutter means which is schematically shown in Fig. 4. This shutter means is exemplified by the shutters 60 which are adjusted between open and closed positions by a linkage 61. This link is moved in either direction by a reversible electric motor 62 which is operated to place the shutters 60 in any one of a number of angular positions through electrical circuits established by a movable contact arm 63 as it engages the stationary contact 64 by means of a suitable conductor 65 connecting the stationary contact 64 with a junction box 66 and the conductors 67 connecting the junction box 66 with the motor 62. Figs. 2 and 3 present a structural showing of the movable contact arm 63 and stationary contacts 64. The stationary contacts 64 are mounted in an enclosed chamber 68 formed between a cover plate 69 and a portion of the wall of the fitting 24.

The movable contact arm 63 is carried by a shaft 70 suitably mounted in the wall of the fitting 24 and extending through the fitting wall part way into the outlet chamber 27 where it is connected to the live end of a coil or helical thermostat 71. The dead end of this thermostat is secured to a nut 72 rotatably mounted in a partition wall 73' of the fitting 24. The nut 72 threadedly engages the piston rod 73, the engaging threads having an overrunning pitch to provide for rotation of the nut 72 upon longitudinal movement of the rod 73.

The rod 73 is carried by a piston 74 which slides within a cylindrical chamber 75 formed in the fitting 24 and closed at its outer end by a threaded plug 76.

The outer end of the cylindrical chamber 75 is connected to the inlet chamber 25 by a duct passageway 77 and the inner end of the cylindrical chamber 75 is connected to the outlet chamber 27 by a duct or passageway 78.

A key 80 engaging a key-way in the piston 74 prevents rotative movement of the piston 74 within the cylindrical chamber 75. A spring 81 urges the piston 74 rightward toward retracted position in engagement with stops 82 as shown in Fig. 2.

Under normal pressure conditions, the piston 74 is held in this extreme right hand position by the spring 81. The nut 72 is also in its normal position holding the dead end of the thermostat 71 stationary. Oil passing through the heat exchanger expands and contracts the thermostat 71 as its temperature increases or decreases, causing a rotative movement of the shaft 70 and the contact arm 63 over the stationary contact 64 to regulate the position of the shutters in a manner to return the temperature of the oil to its normal value. When pressure within the core chamber rises to an abnormal value due to presence of cold sluggish oil in the core chamber, as occurs when there is danger of oil congealing on the tubes 12, or when some congealing of oil has started, the pressure drop between inlet chamber 25 and the outlet chamber 27, applied to the piston 74 by reason of the fluid connections of the two ends of the cylindrical chamber 75 with the inlet chamber 25 and the outlet chamber 27 through the passageways 77 and 78, moves the piston in a leftward direction, causing rotation of the nut 72 to an angle corresponding to the longitudinal movement of the piston 74 and piston rod 73.

The effect of the rotation of the nut 72 is to cause a bodily rotation of the thermostat 71, and a corresponding movement of the control arm 63 so as to close the shutters 60 beyond the position which they would assume under control of the thermostat alone, thereby modifying the control exercised by the thermostat in a manner to reduce the air flow below the value determined by the oil temperature applied to the thermostat. In consequence, the shutters 60, when there exists an abnormal pressure drop between the inlet and outlet ends of the cooler, are held in a relatively more closed position than under normal pressure conditions in response to any given temperature, reducing the rate of heat transfer from oil to air and permitting the cooler to warm up. If there is a severe congealing of oil on the surfaces of the tubes 12, the piston will be moved to the extreme leftward end of its allowable travel and the rotation of the thermostat will be of such magnitude that the control associated therewith will substantially completely close the shutters 60.

I claim as my invention:

1. In an oil cooling system for an internal combustion engine, the combination of: an oil cooler having an oil inlet and an oil outlet; means associated with the cooler for varying the rate of flow of a cooling fluid therethrough; delivery piping connecting the oil outlet of the engine with the oil inlet of the cooler; return piping connected to said cooler outlet to carry off the cooled oil; a coiled thermostat responsive to the temperature of the oil of the cooler and having a live end rotatable with respect to a normally fixed dead end with changing temperatures; means actuated by movement of the live end of said thermostat for controlling said flow varying means; and means responsive to the pressure drop between said oil inlet and said oil outlet for rotating said thermostat so as to change the position of said live end thereof, said last means comprising a hydraulic cylinder and piston device, the cylinder being connected at its ends to said inlet and outlet respectively, the piston being held against rotation, and the piston being connected to rotate the dead end of said thermostat by an overrunning screw and nut means.

2. In an oil cooling system for an internal combustion engine, the combination of: a cooler through which the oil is adapted to be circulated in heat exchange relation to a cooling fluid; means for varying the rate of flow of said cooling fluid through the cooler; a coiled thermostat; means normally holding one end of said thermostat against rotation; and means actuated by rotation of the other end of said thermostat in response to changes in temperature of the oil at a selected point in the system, for controlling said flow varying means, said holding means including a hydraulic cylinder, a piston axially slidable and non-rotatable therein, and an overrunning screw and nut interposed between said piston and said one end of said thermostat, said piston being adapted, in response to a predetermined pressure drop across said cooler, to actuate said overrunning screw and nut so as to rotate said thermostat and thereby override the thermo-responsive action thereof and actuate said flow varying means to decrease the cooling capacity of the cooler.

3. In an oil cooling system for an internal combustion engine, the combination of: an oil cooler through which the oil may be circulated in heat exchange relation to a cooling fluid passing therethrough; means for varying the rate of flow of said cooling fluid through the cooler; a coiled thermostat responsive to the temperature of the oil at a selected point in the system; means for normally holding a dead end of said thermostat in a fixed position; and means actuated by rotation of the live end of said thermostat in response to changing oil temperatures for controlling said flow varying means, said holding means including means linearly shiftable under a predetermined pressure drop across said cooler and a screw jack interposed between said last means and said dead end of the thermostat, for rotating the thermostat, overriding the temperature responsive action thereof, and operating said flow varying means so as to reduce the cooling capacity of the cooler.

4. In an oil cooling system for an internal combustion engine, the combination of: a cooler through which the oil is adapted to be circulated in heat exchange relation to a cooling fluid passed therethrough; means for varying the rate of flow of said cooling fluid through the cooler; a coiled thermostat having a live end and a normally dead end and responsive to the oil temperature at a selected point in the system; means actuated by rotation of the live end of said thermostat in response to changing temperatures for controlling said flow varying means; and means for normally holding the dead end of said thermostat in a fixed position, said holding means including means responsive to a predetermined pressure drop across the cooler for rotating said thermostat so as to override the temperature responsive action thereof and operate said flow varying means so as to decrease the cooling capacity of the cooler.

5. In an oil cooling system for an internal combustion engine, the combination of: an oil cooler through which the oil may be circulated in heat exchange relation with a cooling fluid passed therethrough; means for varying the rate of flow of said cooling fluid through the cooler; a coiled thermostat responsive to the oil temperature at a selected point in the system; means including an electric motor and a switch having a pivotal arm rotated by the live end of said thermostat in response to changing oil temperatures for controlling the operation of said flow varying means; and means for normally holding the other end of said thermostat in a fixed position, said holding means including means responsive to a predetermined pressure drop across the cooler for rotating said thermostat so as to override the temperature responsive action thereof and operate said flow varying means to decrease the cooling capacity of the cooler to a minimum.

6. In an oil cooling system for an internal combustion engine, the combination of: an oil cooler through which the oil may be circulated in heat exchange relation to a cooling fluid passed therethrough; means for controlling the rate of flow of said cooling fluid through the cooler; a thermostat responsive to the oil temperature at a selected point in the system; means including an electric motor and a multiple position switch including a switch arm actuated by the live end of said thermostat for controlling the operation of said flow varying means; and means for normally holding the dead end of said thermostat in a fixed position, said holding means including means responsive to a predetermined pressure drop across the cooler for moving said thermostat so as to shift said switch arm to a terminal position in which it effects the operation of said flow varying means so as to reduce the cooling capacity of said cooler to a minimum.

7. In an oil cooling system for an internal combustion engine, the combination of: a cooler through which the oil may be circulated in heat exchange relation with a cooling fluid passed therethrough; means for varying the rate of flow of said cooling fluid through the cooler; a thermostat responsive to oil temperature at a selected point in the system; means including an electric motor and an electric switch, one contact of which is actuated by the live end of said thermostat for controlling the operation of said flow varying means; and means for normally holding the dead end of said thermostat in a fixed position, said last means including means responsive to a predetermined pressure drop across the cooler for moving the thermostat so as to operate the switch in a manner to reduce the cooling capacity of the cooler.

8. In an oil cooling system for an internal combustion engine, the combination of: an oil cooler through which the oil may be circulated in heat exchange relation to a cooling fluid passed therethrough; means for varying the rate of flow of said cooling fluid through the cooler; a thermostat responsive to oil temperature at a selected point in the system; means controlled by movement of the live end of said thermostat for operating said flow varying means; and means for normally holding the other end of said thermostat in a fixed position, said last means including means responsive to a pressure drop across the cooler in a predetermined amount for moving said other end of the thermostat and thereby moving the thermostat so as to override the thermo-responsive action thereof and operate said flow varying means so as to reduce the cooling capacity of the cooler.

GEORGE HERBERT GILL.